(12) United States Patent
Hettich

(10) Patent No.: US 10,065,293 B2
(45) Date of Patent: Sep. 4, 2018

(54) TOOL, SCREW AND SYSTEM FOR TRANSMITTING A DRIVE TORQUE

(71) Applicant: Ludwig Hettich Holding GmbH & Co. KG, Schramberg-Sulgen (DE)

(72) Inventor: Ulrich Hettich, Schramberg (DE)

(73) Assignee: Ludwig Hettich Holding GmbH & Co. KG, Schramberg-Sulgen (DE)

( * ) Notice: Subject to any disclaimer, the term of this patent is extended or adjusted under 35 U.S.C. 154(b) by 174 days.

(21) Appl. No.: 14/782,895

(22) PCT Filed: Apr. 7, 2014

(86) PCT No.: PCT/EP2014/056933
§ 371 (c)(1),
(2) Date: Oct. 7, 2015

(87) PCT Pub. No.: WO2014/166870
PCT Pub. Date: Oct. 16, 2014

(65) Prior Publication Data
US 2016/0059391 A1 Mar. 3, 2016

(30) Foreign Application Priority Data
Apr. 8, 2013 (DE) .......................... 10 2013 103 463

(51) Int. Cl.
*B25B 15/00* (2006.01)
*B25B 23/10* (2006.01)
*F16B 23/00* (2006.01)

(52) U.S. Cl.
CPC .......... *B25B 15/004* (2013.01); *B25B 15/005* (2013.01); *B25B 23/108* (2013.01); *F16B 23/003* (2013.01)

(58) Field of Classification Search
CPC ... B25B 15/004; B25B 15/005; B25B 23/108; F16B 23/003
See application file for complete search history.

(56) References Cited

U.S. PATENT DOCUMENTS 2,402,342 A * 6/1946 Phillips ............... F16B 23/0023
411/404
3,295,572 A * 1/1967 Wing ..................... B25B 15/005
403/361

(Continued)

FOREIGN PATENT DOCUMENTS

EP  1 036 151  9/2000
EP  1 039 151  9/2000

(Continued)

OTHER PUBLICATIONS

The International Bureau, International Preliminary Report on Patentability, International Application No. PCT/EP2014/056933 dated Oct. 22, 2015, 7 pages.

(Continued)

*Primary Examiner* — Robert Scruggs
(74) *Attorney, Agent, or Firm* — Sunstein Kann Murphy & Timbers LLP

(57) ABSTRACT

The present invention relates to a drive tool, a screw and a system for transmitting a drive torque. The drive tool can be guided in a receiving recess of a connecting partner, in particular in a receiving recess of the screw, and transmit the drive torque during a rotation about a central axis. The drive tool has radially outwardly projecting first projections which are wedgeshaped in cross-section and which are suitable for transmitting the drive torque to the connecting partner. The drive tool comprises a quasi-cylindrical section in which all of the surface lines in the region of the quasicylindrical section form an angle of less than 10° with the central axis, but the outer face is, at least in sections, of conical form such that the surface lines in the respective section are inclined by at least 1.5° with respect to the central axis.

18 Claims, 3 Drawing Sheets

(56) References Cited

U.S. PATENT DOCUMENTS

| | | | | |
|---|---|---|---|---|
| 5,509,334 | A | * | 4/1996 | Shinjo .................. B25B 15/005 81/436 |
| 6,158,310 | A | * | 12/2000 | Goss .................... B25B 13/065 411/402 |
| 6,886,433 | B2 | * | 5/2005 | Totsu ...................... B21K 1/46 411/404 |
| 8,616,097 | B2 | * | 12/2013 | Hughes ................ B25B 15/005 81/460 |
| 8,955,417 | B2 | * | 2/2015 | Stiebitz ................ F16B 23/003 411/403 |
| 2007/0245863 | A1 | | 10/2007 | Edland .......................... 81/460 |

FOREIGN PATENT DOCUMENTS

| | | |
|---|---|---|
| EP | 2 363 245 | 9/2011 |
| WO | WO 99/09127 | 2/1999 |

OTHER PUBLICATIONS

European Patent Office, International Search Report, International Application No. PCT/EP2014/056933 dated Jun. 26, 2014 together with the Written Opinion, 9 pages.

* cited by examiner

TOOL, SCREW AND SYSTEM FOR TRANSMITTING A DRIVE TORQUE

FIELD OF THE INVENTION

The present invention lies in the field of connection- and force transmission technology. It relates particularly to a drive tool for transmitting a drive torque to a connection partner, particularly to a screw, a corresponding screw and a system which comprises said drive tool and screw.

BACKGROUND OF THE INVENTION

Known in the art are a plurality of drive tools with wedge profiles, with which a torque resp. drive torque can be transmitted to a connection partner, for example to a screw. To transmit the drive torque from the drive tool to the connection partner, the drive tool is inserted into a receiving recess of the connection partner and the drive tool is rotated about a central axis.

As an example for a wedge profile of a drive tool, particular reference is made to the U.S. Pat. No. 3,584,667, which relates to a connection arrangement and a drive tool, which is widely distributed around the world under the trade name TORX. This profile has also entered the international standards under the term "hexalobular". The "internal hexalobular socket" is specified in the international standard ISO 10664 and a screw having a correspondingly formed receiving recess is specified in the international standard ISO 14583.

In the present description, a drive tool and a related resp. suitable connection partner are described as a system or drive system. The different drive systems in the prior art have been developed predominantly with regard to the transmission of drive torques. Many wedge profiles are in this context essentially cylindrical, i.e. the cross-sectional profile of the wedge profile resp. its shape is substantially unchanged along the central axis of the drive tool. Unlike the cylindrical drive systems, the prior art also comprises conical drive systems, in which the drive tool, or sections thereof, taper in the direction of its central axis. Examples of conical drive tools are the "Pozidriv" and "Phillips H" drive tools.

Through suitable choice of the geometry in the case of conical systems, it is possible to push the connection partner onto the drive tool and to connect them by means of clamping or wedging. A certain force must be applied to release the clamping connection. One speaks in this case of a so-called "stick-fit" effect. The holding force brought about by the stick-fit effect generally exceeds several-fold the dead weight of the connection partner. This makes it possible to hold and guide the connection partner with the drive tool in all possible positions.

To achieve a stick-fit effect, drive systems with surfaces, which are inclined with respect to the central axis and whose surface normals respectively have a component in the circumferential direction and thus, expressed simply, have drive surfaces that are inclined in the circumferential direction, are used in the prior art. Unlike purely cylindrical drive systems, such drive systems have the disadvantage of producing a reaction force in the axial direction during a drive torque load, which means that they have a tendency to lever out the drive tool. In reference to the drive tool, the term "axial direction" in the present description means the direction of the central axis.

One disadvantage of cylindrical systems, on the other hand, is that a stick-fit effect is not possible. A further disadvantage of the cylindrical system is that a play must exist between the drive tool and the receiving recess of the connection partner in order to be able to insert the drive tool. This play results in the connection partner being inadequately guided axially and the drive tool being possibly tilted with respect to the connection partner within an imaginary conical surface with respect to the central axis of the connection partner. This effect is also described as "wobble".

Drive systems of this type with a comparatively large wobble are for example not suitable for screw connections, which require axial guidance, such as screw connections with screws that have a drill tip.

SUMMARY OF THE INVENTION

The object of the invention is to provide a drive tool, a screw and a system consisting of a drive tool and a screw, with which a stick-fit effect is possible, in which in the event of a drive torque load little or no reaction force is brought about in the axial direction and which at the same time exhibit comparatively minor wobble.

This object is achieved by a drive tool according to Claim 1, by a screw according to Claim 8 and by a system according to Claim 12. Advantageous further embodiments are specified in the dependent claims.

The drive tool according to the invention serves to transmit a drive torque to a connection partner. The connection partner can be, for example, a screw. The drive tool is suitable for being inserted into a receiving recess of the connection partner and, during rotation about a central axis, for transmitting the drive torque to the connection partner. The drive tool comprises a first end, a second end and radially outwardly projecting first protrusions that are wedge-like in their cross-section. Between each two adjacent first protrusions there is respectively one radially inner core section, and each of the wedge-like first protrusions comprises a radially outer vertex section. With the help of the first protrusions the drive torque can be transmitted to the connection partner.

In order to obtain a stick-fit effect with a suitable connection partner the drive tool has a "quasi-cylindrical" section.

The outer surface of the quasi-cylindrical section is "quasi-cylindrical" in the sense that all surface lines in the region of the quasi-cylindrical section form an angle with the central axis that is smaller than 10°, while the outer surface is, at least in sections, tapered such that the surface lines in the respective section with respect to the central axis are inclined by at least 1.5°, preferably by at least 2.5°. In the case of the drive tool, the surface lines are defined as an intersection line between the outer surface of the drive tool and a plane which contains the central axis. In a really cylindrical section, all surface lines would be exactly parallel to the central axis. In the "quasi-cylindrical section" of the drive tool according to the invention, the angles of all surface lines in relation to the central axis are small, namely less than 10°, so that one might consider it approximately cylindrical. Nevertheless it is slightly tapered, at least in sections, to be able to produce a stick-fit effect with a cylindrical (or also quasi-cylindrical) receiving recess. It should be noted that here, unlike for example in the case of the Pozidriv drive, a stick-fit effect is produced with only a very slightly conical tool section rather than with an element which is wedge-shaped in the axial direction. In this way it is prevented that the drive tool is levered out of the connection partner when a drive torque load is present.

In order to achieve a stick-fit effect between the drive tool and the connection partner, the surface lines of the outer surface of the drive tool must exceed a certain angle, at least in sections, but said angle should not be substantially greater than the friction angle, which is dependent on the friction coefficients of the drive tool and the connection partner. Normal friction coefficients have a value in the range of 0.15. This value corresponds to a friction angle of 8.5°. The inventors have recognized that the aforementioned angle range of 1.5° to 10° is optimally suitable for obtaining a stick-fit effect with a suitable connection partner.

The wobble is on the one hand determined by the manufacturing tolerances but to a much greater extent by the penetration depth of the drive tool in the receiving recess of the connection partner. In order to increase the penetration depth with respect to conventional drive tools, the drive tool according to the invention further has a tapering section tapering towards the first end. The tapering section is arranged on the side of the quasi-cylindrical section that is closer to the first end, and its surface lines in the region of the radially outer vertex sections of the first protrusions have, at least in sections, an angle with respect to the central axis of at least 30°, preferably at least 40° and particularly preferably at least 44°.

Due to the tapering section, the drive tool can be inserted deeper into a corresponding receiving recess of a corresponding connection partner without, for example, the wall thickness between the receiving recess and the outside of the connection partner having to be reduced. Usually, for connection partners, e.g. in the case of screws, the depth of the receiving recess is limited by the minimum wall thickness in a purely cylindrical receiving recess and an outer surface of the connection partner that is oblique with respect to the receiving recess in the region of the receiving recess, the wall thickness decreases as the depth of the receiving recess increases. Due to the tapering section, the drive tool according to the invention is suitable for connection partners having a deeper receiving recess, whose minimum wall thickness, however, is not reduced. The penetration depth can thus be increased and the wobble of the drive tool in relation to the connection partner can be reduced.

Alternatively the tapering section can also be described as being "chamfered" resp. inscribable in an imaginary truncated cone which has a half angle of at least 30°, preferably of at least 40° and particularly preferably of at least 44°.

The axially inclined surface lines, which bring about the stick-fit effect, are preferably located in the core sections, i.e. between every two adjacent first protrusions. These core sections, which are inclined with respect to the central axis, are facing substantially radially outwards and not in the circumferential direction and are thus only minimally or not at all involved in the generation of the drive torque. Therefore, in the event of a drive torque load in connection with a connection partner, little or no reaction force is produced in the axial direction. This more effectively prevents the drive tool according to the invention, which generates a stick-fit effect, from being levered out of the connection partner during a drive torque load.

In order to generate the stick-fit effect, the surface lines in the radially outer vertex sections of the first protrusions in the quasi-cylindrical section can additionally or alternatively, at least in sections, be inclined with respect to the central axis by at least 1.5°, preferably by at least 2.5°. As in the core sections, the outer surface in the region of the radially outer vertex sections is not facing in the circumferential direction. Thus, also the portion of the stick-fit effect caused by an inclined surface line in radially outer vertex sections is not accompanied by a production of a reaction force in the axial direction, such that levering-out of the drive tool can be safely prevented despite the stick-fit effect.

In accordance with one embodiment, the wedge-like first protrusions of the drive tool may be shaped and arranged such that the cross-sectional shape of the quasi-cylindrical section substantially corresponds to the cross-sectional shape of a hexalobular profile according to ISO 10664. Thus, the drive tool can provide a modified hexalobular drive, which offers the advantage, as compared to a conventional hexalobular drive, that the wobble is less and a stick-fit effect without a levering-out is enabled.

Preferably the surface lines in the tapering section in the region of the radially outer vertex sections of the first protrusions have, at least in sections, an angle with respect to the central axis of less than 60°, preferably less than 50° and particularly preferably less than 46°. Thus, said half angle of said imaginary truncated cone is particularly preferably in a range between 44° and 46° so that such a drive tool can be used, for example, for countersink screws with a countersink angle of approximately 90°. Since the drive tool, however, is not limited to such connection partners, other angle ranges, as mentioned above, may be present for the drive tool according to the invention.

It is further advantageous in the case of the drive tool if the surface lines in the tapering section in the radially inner core sections are arranged, at least in sections, at an angle with respect to the central axis of less than 1.5°. Particularly preferably, the surface lines in said areas are arranged, at least in sections, almost parallel with respect to the central axis. These areas, when considered together, thus enable a precise guidance of the drive tool in a corresponding receiving recess with little play. Thereby, in conjunction with a suitable connection partner having a suitable receiving recess, the wobble can be further reduced.

In order to achieve a particularly good stick-fit effect, the surface lines in said quasi-cylindrical section preferably form with the central axis an angle that is less than or equal to 4.5°.

To prevent severe caulking resp. wedging with a connection partner, the drive tool preferably further comprises a specially shaped end section. The end section is arranged on the side of the quasi-cylindrical section that is closer to the second end and has surface lines which diverge towards the second end of the central axis. Upon diverging, the surface lines preferably form an angle with the central axis that is greater than 4.5° and that particularly preferably increases towards the second end, wherein in particular an angle of 10° is reached or exceeded. Due to its shape, the end section can affect how far the drive tool can be inserted into a receiving recess and thereby co-determine resp. limit the strength of the stick-fit effect.

Moreover, the present invention comprises a screw to which a drive torque can be transmitted by means of a drive tool according to any one of the previously described embodiments. The screw comprises a first screw end, a second screw end and a shaft section with a thread. The shaft section defines a screw axis. Like the aforementioned central axis of the drive tool, the screw axis is also an imaginary line, which serves to describe the location and arrangement relationships. The screw further comprises a head section, which is arranged at the second end of the screw and that comprises a receiving recess.

The receiving recess serves to receive a drive tool according to any one of the above-described embodiments and has a shape, which is defined by an inner surface. The inner surface comprises radially inwardly projecting second protrusions, which are wedge-like in cross-section and which the drive torque can engage with by way of the first protrusions of the drive tool. Furthermore, the inner surface comprises a cylindrical or quasi-cylindrical recess section in which the inner surface is cylindrical or quasi-cylindrical in the sense that its surface lines form an angle with respect to the screw axis that is less than or equal to 4.5°, wherein in particular an angle of 0° is possible, which corresponds to the cylindrical variant. According to the aforementioned definition, the surface lines of the screw are defined as an intersection line between the inner surface and a plane which contains the screw axis.

The screw according to the invention can receive the quasi-cylindrical section of the drive tool according to the invention in its cylindrical or quasi-cylindrical recess section, wherein a stick-fit effect is produced by cooperation of the quasi-cylindrical section of the drive tool with the cylindrical or quasi-cylindrical recess section of the screw. Due to the described geometry and angle ranges, no axial reaction force is produced or it has little or no effect in the event of a drive torque load.

According to the tapering section of the drive tool, the screw comprises a tapering recess section that is suitable for receiving the tapering section of the drive tool. The tapering recess section is arranged on the side of the cylindrical or quasi-cylindrical recess section that is closer to the first screw end and that tapers towards the first screw end. The surface lines of the tapering recess section in the region between the second protrusions have, at least in sections, an angle with respect to the screw axis of at least 30°, preferably at least 40° and particularly preferably at least 44°. The receiving recess can thereby have a comparatively large depth, without the wall thickness in the lower region of the receiving recess having to be necessarily thinner. This would be the case, for example, if a cylindrical receiving recess were extended cylindrically downwards in a head section having a countersink shape.

Preferably, the surface lines in the tapering recess section in the region between the second protrusions have, at least in sections, an angle with respect to the screw axis of less than 60°, preferably less than 50° and particularly preferably less than 46°.

In an advantageous further embodiment, the surface lines in the tapering recess section in the region of the vertex of the second protrusions are arranged, at least in sections, at an angle with respect to the screw axis of less than 1.5°. They are preferably run at least almost parallel with respect to the screw axis. With the help of this region or section, the screw according to the invention can receive a drive tool according to any one of the aforementioned embodiments in a very well-guided manner, such that the wobble is reduced.

In accordance with an embodiment, the receiving recess of the screw may be shaped such that the cross-sectional shape of the receiving recess in the cylindrical or quasi-cylindrical recess section substantially corresponds to the cross-sectional shape of a receiving recess with hexalobular profile of a screw according to ISO 14583. In this manner, the screw can provide a modified hexalobular screw, which offers the advantages, compared to a conventional hexalobular screw, that its wobble is less and that it permits a stick-fit effect without levering out of the drive tool.

Finally, the present invention comprises a system that comprises a screw according to any one of the aforementioned embodiments and a drive tool according to any one of the aforementioned embodiments. To produce a connected state of the system, the drive tool can be releasably inserted into the receiving recess of the screw.

In the system, the shape of the receiving recess is preferably adapted to the shape of the drive tool such that in the connected state, from a central position in which the central axis of the drive tool and the screw axis coincide, the screw and the drive tool can be tilted against one another by a maximum of 10° and preferably by a maximum of 5°. This maximum tilting of the screw and the drive tool in the connected state corresponds in this context to the wobble referred to above, wherein these terms can be used interchangeably.

In an advantageous further embodiment, in the connected state of the system, the play between the outer surface of the drive tool and the inner surface of the receiving recess in the region between the second protrusions of the receiving recess is greater than in the region of the core sections of the drive tool. Accordingly, not all regions of the outer surface of the drive tool and the inner surface of the receiving recess need to be manufactured with the same high manufacturing tolerance in order to achieve the advantageously minor wobble. In concrete terms, this results in the case of the screw in a higher requirement for manufacturing precision in the region of the radially inner vertices of the wedge-like second protrusions, which is advantageous from a manufacturing perspective. The wobble is substantially influenced and limited by the minor play in said regions, i.e. by the cooperation of the radially inner core sections of the drive tool with the radially inner vertex regions of the wedge-like second protrusions.

In the system, the head section of the screw may comprise a countersink shape with a countersink angle $\beta$. In the tapering section of the drive tool, the surface lines in the region of the radially outer vertex sections of the first protrusions then preferably have, at least in sections, an angle with respect to the central axis that is greater or equal to $0.7 \times \beta/2$, preferably greater or equal to $0.9 \times \beta/2$, and/or less than or equal to $1.3 \times \beta/2$, preferably less than or equal to $1.1 \times \beta/2$.

BRIEF DESCRIPTION OF THE FIGURES

Further benefits and features of the invention become apparent from the following description, in which preferred embodiments of the invention are described in more detail with reference to the accompanying figures. The same reference numbers are used in different figures for mutually corresponding parts.

DESCRIPTION OF PREFERRED EMBODIMENTS

Figure 1:
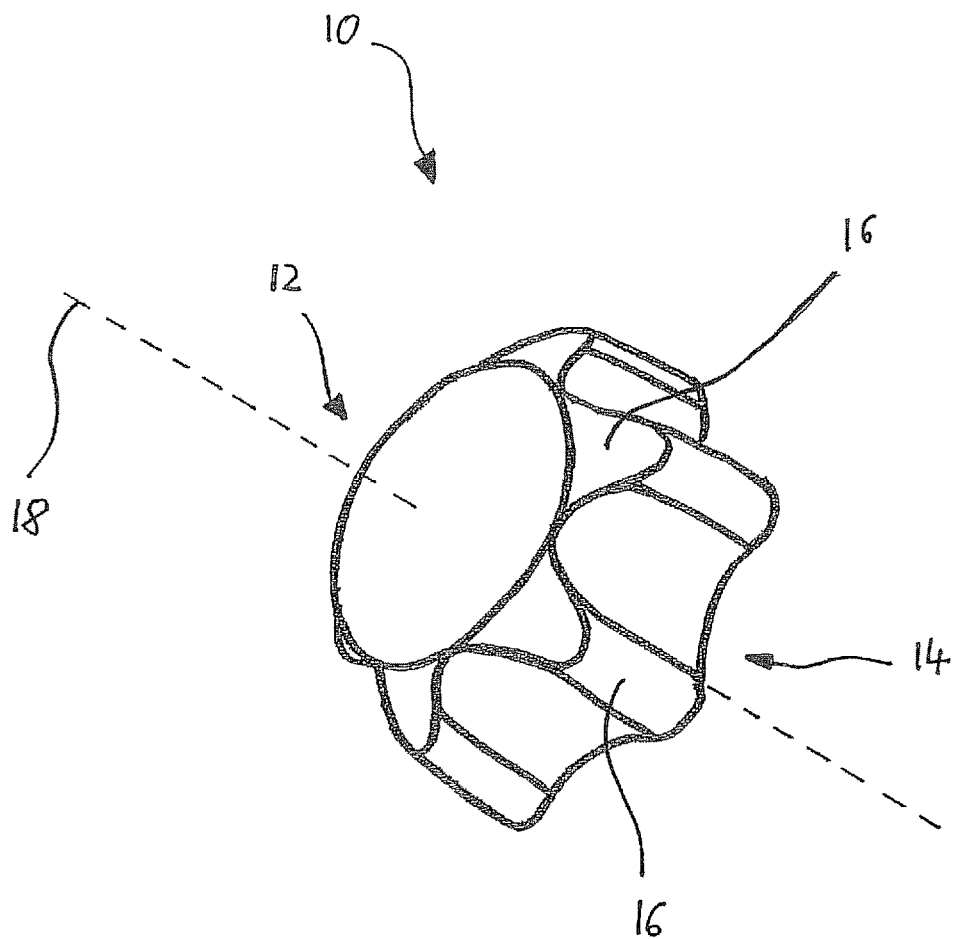
FIG. 1 shows a perspective view of a drive tool in accordance with a preferred embodiment of the invention.

FIG. 1 shows a drive tool 10 in accordance with an embodiment of the present invention. The drive tool 10 has a first end 12, a second end 14 and radially outwardly-projecting first protrusions 16 that are wedge-like in cross-section. The drive tool 10 is suitable for transmitting a drive torque to a connection partner (not shown), for example a screw during rotation about the central axis 18.

Figure 2:
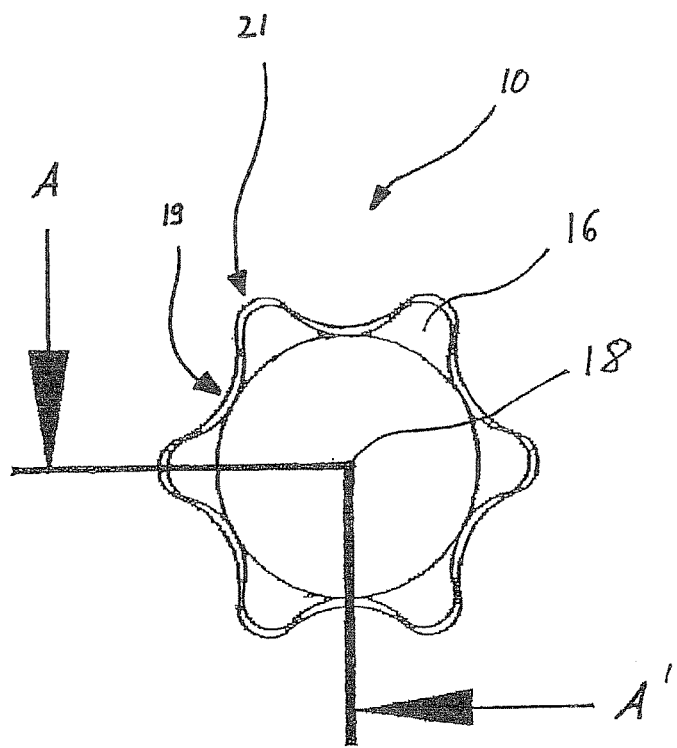
FIG. 2 shows a plan view of the drive tool of FIG. 1.

FIG. 2 shows a plan view of the drive tool 10 from FIG. 1 with a viewing direction along the central axis 18. In FIG. 2, it can be seen that the first protrusions 16 have a wedge-like cross-section and project radially outwards, i.e. perpendicular to the central axis 18. Between every two adjacent first protrusions 16 there is respectively one radially inner core section 19. Each first protrusion 16 also has a radially outer vertex section 21. In FIG. 2 only the position of the central axis 18 at the corner of the angled line from A to A' is shown. The central axis 18 runs perpendicular to the drawing plane.

Figure 3:
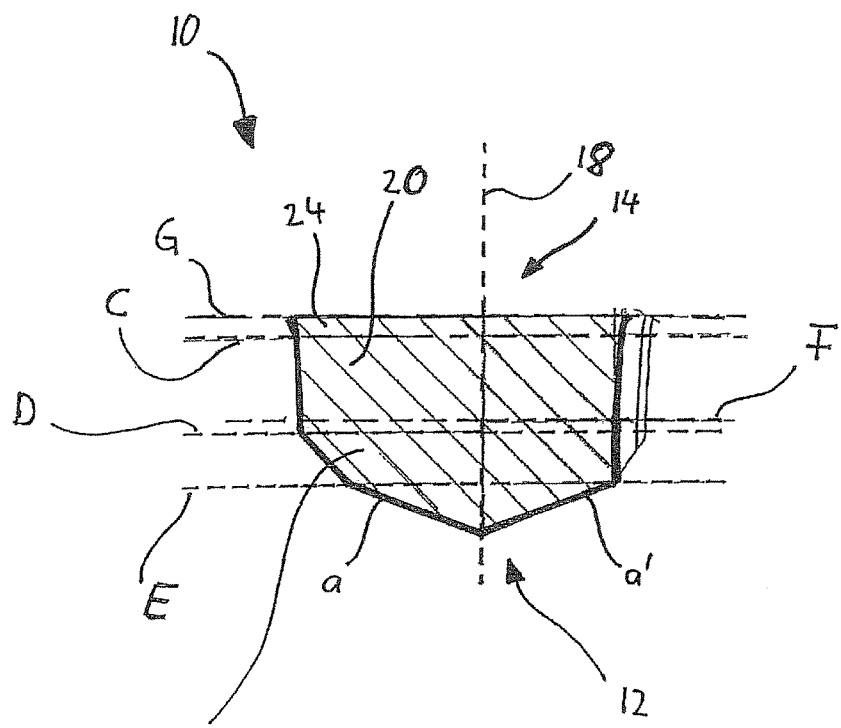
FIG. 3 shows a sectional view of the drive tool of FIG. 1 for a cross-section along the angled line from A to A' marked in FIG. 2.

FIG. 3 shows a lateral sectional view of the drive tool 10 for a cross-section along the angled line from A to A' marked in FIG. 2. Herein, the cross-section from A to the central axis 18 in FIG. 2 corresponds in FIG. 3 to the region to the left of the central axis 18. The cross-section from the central axis 18 to A' in FIG. 2 corresponds in FIG. 3 to the region to the right of the central axis 18.

In FIG. 3, two sections of different surface lines of the drive tool are shown by the bold lines a and a'. On the left side of the central axis 18, the sectional view is bordered by a section of a surface line a. In the present disclosure the term "surface line of the drive tool" always describes the intersection line of the outer surface of the drive tool with a plane, which contains the central axis 18. In the case of the surface line a, this is the sectional plane marked in FIG. 2 that extends between the arrow A and the central axis 18. The hatched region in FIG. 3 to the right of the central axis 18 is bordered by another surface line a', which is the intersection line of the outer surface of the drive tool 10 with the further sectional plane that is marked in FIG. 2 and extends between the central axis 18 and the arrow A'. The surface line sections a and a', which are shown in one plane FIG. 3 are located in reality in sectional planes, which are perpendicular to each other. The surface line section shown to the left of the central axis 18 runs along a radially outer vertex section 21 of a first protrusion 16. However, the surface line section a', which is shown to the right of the central axis 18 runs through a radially inner core section 19 between adjacent first protrusions 16.

The embodiment of the drive tool 10 shown in FIG. 3 comprises a quasi-cylindrical section 20, a tapering section 22 and an end section 24. As shown in FIG. 3, the quasi-cylindrical section 20 in the axial direction along the central axis 18 is bordered by the dashed lines C and F, the tapering section 22 is bordered by the lines D and E and the end section 24 is bordered by the lines G and C. The end section 24 is arranged on the side of the quasi-cylindrical section 20 that is closer to the second end 14. The tapering section 22 is arranged on the side of the quasi-cylindrical section 20 that is closer to the first end 12. In the embodiment of the drive tool 10 shown in FIG. 3, the surface lines in the quasi-cylindrical section 20 in the radially inner core sections 19 (see surface line a') form an angle of 3.5° with the central axis 18.

On the tapering section 22, the drive tool 10 tapers towards the second end 12. As can be seen in FIG. 3, in the embodiment of FIG. 3, the surface lines in the region of the radially outer vertex sections 21 of the first protrusions 16 (surface line section a in FIG. 3) form an angle of 45° in the tapering section 22 with the central axis 18. In other words, the tapering section 22 of the embodiment from FIG. 3 can be inscribed in an imaginary truncated cone, which has a half opening angle of 45°.

In the region that is located in FIG. 3 between the dashed lines E and F, the surface lines of the drive tool 10 of the embodiment of FIG. 3 are arranged at an angle with respect to the central axis of less than 1.5° in radially inner regions between adjacent first protrusions 16. They preferably run parallel to the central axis. This can be seen in FIG. 3 on the right side of the central axis 18 with the surface line a' that runs between the dashed lines E and F at least almost parallel to the central axis 18. Due to this region, the drive tool 10 can be guided very well resp. precisely-fitting into a receiving recess of an associated connection partner, whereby the wobble can be additionally reduced—i.e. other than by a greater depth of penetration.

As described, on surfaces that are facing in the circumferential direction, the drive tool 10 does not require surface lines that are inclined with respect to the central axis 18. Thereby, the axial reaction force that is generated when a drive torque is applied can be prevented. The drive tool 10 is therefore also not levered out or "pushed out" when a drive torque is applied.

In the end section 24 shown in FIG. 3, the surface lines diverge towards the second end 14. As shown in FIG. 3, the angle between the surface lines and the central axis 18 in the end section 24 increases towards the second end 14. In the illustrated embodiment of the drive tool 10, an angle of 20° is achieved in the end section 24. The end section 24 prevents too much caulking of the drive tool 10 in the receiving recess of the connection partner. In this manner it can limit the strength of the stick-fit effect to a desired degree.

Although in the embodiment in FIG. 3, the surface lines in the end section 24 in the region of the radially outer vertex sections 21 of the first protrusions 16 (surface line section a) exhibit substantially the same course as the surface lines in the end section 24 in the region between adjacent first protrusions 16 (surface line section a'), it should be noted that the course in the respective areas can also differ.

It is noted that the wedge profile of the drive tool 10 in accordance with the embodiment of the FIGS. 1 to 3 with its six first protrusions 16, can be viewed as a modified hexalobular profile.

Figure 4:
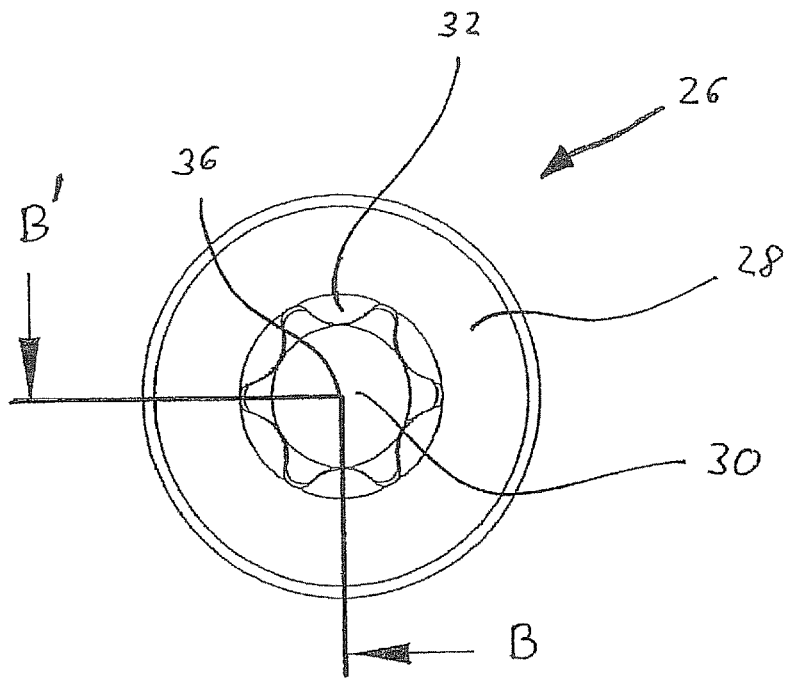
FIG. 4 shows a plan view of a screw in accordance with a preferred embodiment of the invention.

FIG. 4 shows a plan view of a screw 26 in accordance with an embodiment of the invention. The screw 26 has a head section 28, which comprises a receiving recess 30. The shape of the receiving recess 30 is defined by an inner surface, which comprises radially inwardly projecting second protrusions 32, which are wedge-like in cross-section.

Figure 5:
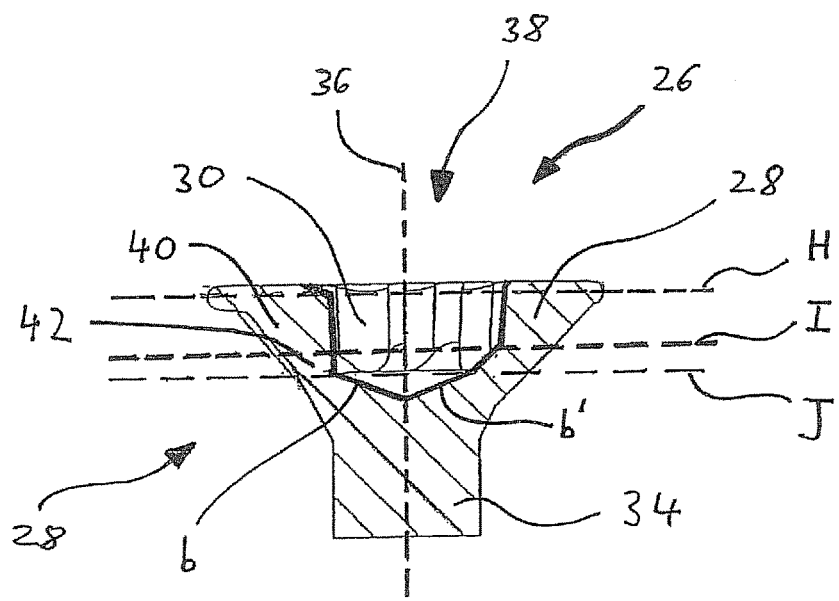
FIG. 5 shows a sectional view of a section of the screw of FIG. 4 for a cross-section along the angled line from B to B' marked in FIG. 4.

FIG. 5 shows a sectional view of the screw 26 of FIG. 4 for a cross-section along the angled line from B to B' marked in FIG. 4. The screw 26 comprises a shaft section 34, only a part of which is shown in FIG. 5, and which defines a screw axis 36. The head section 28 is arranged at a second screw end 38. In the direction of the screw axis 36, the head section 28 is arranged opposite a first screw end (not shown). The section area shown in FIG. 5 to the left of the screw axis 36 corresponds to a cross-section from B to the screw axis 36 through a vertex of a second protrusion 32, as can be seen in FIG. 4. The section area shown in FIG. 5 to the right of the screw axis 36 corresponds to a cross-section from B' to the screw axis 36 through a region that is arranged between two adjacent second protrusions 32, as can be seen in FIG. 4. The section areas that are shown in FIG. 5 to the left and to the right of the screw axis 36 and in one plane are in reality perpendicular to one another.

In FIG. 5, to the right and to the left of the screw axis 36 respectively, the section of a surface line b' resp. b is marked by a bold line. Unlike the surface lines of the drive tool 10, the surface lines of the screw 26 run on the inner surface, which defines the receiving recess 30. In the case of a screw, the surface lines are defined as an intersection line between said inner surface and a plane which contains the screw axis 36.

The embodiment of the screw 26 shown in FIGS. 4 and 5 is suitable for receiving the drive tool 10 in accordance with the embodiment shown in FIGS. 1 to 3. To this end, the receiving recess 30 of the screw 26 comprises a cylindrical (or quasi-cylindrical) recess section 40 and a recess section 42 that tapers towards the first screw end (not shown). The cylindrical or quasi-cylindrical recess section 40 is arranged between the dashed lines H and I marked in FIG. 5. The tapering recess section 42 is arranged between the dashed lines I and J marked in FIG. 5.

In the case of the screw 26 in accordance with the embodiment from FIG. 5, the surface lines in the tapering recess section 42 in the region between the second protrusions 32 have an angle of 45° with respect to the screw axis 36. This can be seen in FIG. 5 with the surface line section b'. As shown in FIG. 5, the tapering recess section 42 is arranged on the side of the cylindrical or quasi-cylindrical recess section 40 that is facing away from the second screw end 38 resp. that is closer to the first screw end (not shown). In the cylindrical or quasi-cylindrical recess section 40, the surface lines have an angle with respect to the central axis that is less than or equal to 4.5°.

The screw 26 in accordance with the embodiment illustrated in FIG. 5 exhibits a countersink head with a countersink angle of 90°, i.e. the outer surface of the head is inclined at an angle of 45° with respect to the screw axis 36. As described above, this angle also corresponds to the angle of the surface lines in the tapering recess section 42 in the region between the second protrusions 32. The surface lines in the region between adjacent second protrusions 32 (e.g. surface line section b'), which predominantly determine the minimum wall thickness, therefore run in the tapering recess section 42 parallel to the outer surface of the head section 28. Thereby, the wall thickness downstream from the cylindrical or quasi-cylindrical recess section 40 does not decrease further towards the first screw end, such that the necessary stability of the screw is guaranteed.

Due to the tapering section 22 of the drive tool 10 and due to the tapering recess section 42 of the receiving recess 30 of the screw 26, the drive tool 10 can be inserted comparatively deeply into the receiving recess 30 of the screw 26. In this context, the wall thickness in the region of the head section 28 of the screw 26 is preferably not reduced, so that the stability of the screw 26 is fully retained. At the same time, however, the wobble between the drive tool 10 and the screw 26 is advantageously reduced.

Through the cooperation of the previously described quasi-cylindrical section 20 of the drive tool 10 with the cylindrical (or quasi-cylindrical) recess section 40 of the receiving recess 30 of the screw 26, a stick-fit effect is additionally achieved during the reception of the drive tool 10 in the receiving recess 30 of the screw 26. The drive tool 10 and the screw 26 form a system, which is in a connected state when the drive tool 10 is received in the receiving recess 30. Due to the stick-fit effect, the system can be pivoted in any spatial direction without the screw 26 loosening or falling out of the drive tool 10 in this process. In order to sever the connected state, a certain force, which overcomes the holding force of the stick-fit effect, must be applied.

When the drive tool 10 is rotated in the connected state about the central axis 18, the drive torque is transmitted to the screw 26 via the first protrusions 16 and the second protrusions 32, which engage with one another.

The profile of the receiving recess 30 of the screw 26 according to the invention of one of the previously described embodiments can be viewed as a modified hexalobular profile. To provide all the benefits according to the invention, the screw 26 of the described embodiments is preferably used with the drive tool 10 of the described embodiments. It is, however, also possible to use the screw 26 with a conventional drive tool having a hexalobular profile in accordance with the international standard ISO 10664.

Even if preferred exemplified embodiments are shown and described in detail in the figures and the preceding description, this should be considered as purely exemplary and not restrictive with regard to the invention. In particular, the invention is not restricted to the angles specified in conjunction with the exemplified embodiments for particular surface lines or for the countersink head of the screw. It should be noted that only the preferred exemplified embodiments have been shown and described in detail and changes and modifications that lie within the current and future scope of the invention should be protected. The features shown and described can be significant in any combination.

LIST OF REFERENCE NUMERALS

10 Drive tool
12 First end
14 Second end
16 First protrusions
18 Central axis
19 Radially inner core section
20 Quasi-cylindrical section
21 Radially outer vertex section
22 Tapering section
24 End section
26 Screw
28 Head section
30 Receiving recess
32 Second protrusions
34 Shaft section
36 Screw axis
38 Second screw end
40 Cylindrical or quasi-cylindrical recess section
42 Tapering recess section

The invention claimed is:
1. A system, which comprises the following:
a screw and, a drive tool, the drive tool configured for transmitting a drive torque to the screw, by insertion of the drive tool into a receiving recess of the screw and transmission of the drive torque during a rotation about a central axis,
the drive tool comprising:
a first end and a second end,
radially outwardly projecting first protrusions having a wedge-shaped cross-section, wherein the radially outwardly projecting first protrusions are configured for transmitting the drive torque to the screw, and wherein one radially inner core section, respectively, is arranged between every two adjacent first protrusions and each of the first protrusions comprises a radially outer vertex section;
a quasi-cylindrical section, having an outer surface with surface lines, which are defined as intersection lines between the outer surface and a plane containing the central axis, wherein the surface lines form, in the region of the quasi-cylindrical section, an angle of less than 10° with the central axis;
wherein the outer surface, at least in sections, has a conical shape in which the surface lines in the core sections are inclined by at least 1.5° with respect to the central axis, and
wherein the drive tool comprises a tapering section tapering towards the first end, which tapering section is arranged on a side of the quasi-cylindrical section closer to the first end and in which the surface lines in the region of the radially outer vertex sections of the first protrusions have, at least in sections, an angle of at least 30° and less than 60° with respect to the central axis,
wherein the screw comprises:
a first screw end and a second screw end, a shaft section with a thread, wherein the shaft section defines a screw axis, and
a head section that is arranged at the second screw end and that comprises a receiving recess, wherein the shape of the receiving recess is defined by an inner surface comprising:
radially inwardly projecting second protrusions that are wedge-like in cross-section, which the drive torque can engage with via the first protrusions of the drive tool,
a cylindrical or quasi-cylindrical recess section, with an inner surface, wherein the surface lines, which are defined on the screw as intersection lines between the inner surface and a plane that contains the screw axis, and the surface lines form an angle with the screw axis that is less than or equal to 4.5° in the region of the cylindrical or quasi-cylindrical recess section,
wherein the receiving recess comprises a recess section tapering towards the first screw end, which is arranged on the side of the cylindrical or quasi-cylindrical recess section that is closer to the first screw end and in which the surface lines in the region between the second protrusions have, at least in sections, an angle with respect to the screw axis of at least 30° and less than 60°, wherein the drive tool can be releasably inserted into the receiving recess of the screw to form a connected state of the system, and
wherein the shape of the receiving recess is adapted to the shape of the drive tool such that the screw and the drive tool, from a central position in which the central axis of the drive tool and the screw axis coincide, can be tilted in the connected state against one another by a maximum of 10°.

2. The system according to claim 1, in which, in the connected state, the play between the outer surface of the drive tool and the inner surface of the receiving recess in the region between the second protrusions of the receiving recess is greater than in the region of the core sections of the drive tool.

3. The system according to claim 1, in which the head section of the screw has a countersink shape with a countersink angle β, wherein the surface lines in the tapering section of the drive tool in the region of the vertex sections have, at least in sections, an angle with respect to the central axis
that is greater than or equal to 0.7×β/2, and
that is less than or equal to 1.3×β/2.

4. The system according to claim 1, wherein in the drive tool, the surface lines in the quasi-cylindrical section in the radially outer vertex sections are inclined, at least in sections, by at least 1.5° with respect to the central axis.

5. The system according to claim 1, wherein in the drive tool the cross-sectional shape of the quasi-cylindrical section substantially corresponds to the cross-sectional shape of a hexalobular profile according to ISO 10664.

6. The system according to claim 1, wherein in the drive tool, the surface lines in the tapering section in the region of the vertex sections have, at least in sections, an angle with respect to the central axis of less than 50°.

7. The system according to claim 1, wherein in the drive tool, the surface lines in the tapering section in the radially inner core sections run, at least in sections, at an angle with respect to the central axis of less than 1.5°.

8. The system according to claim 1, wherein in the drive tool, the surface lines in said quasi-cylindrical section form an angle with the central axis that is less than or equal to 4.5°.

9. The system according to claim 1, said drive tool further comprising: an end section, arranged on a side of the quasi-cylindrical section that is closer to the second end and having surface lines that diverge towards the second end of the central axis and upon diverging form an angle with the central axis that is greater than 4.5°.

10. The system according to claim 1, wherein in the screw, the surface lines in the tapering recess section in the region between the second protrusions have, at least in sections, an angle with respect to the screw axis of less than 50°.

11. The system according to claim 1, wherein in the screw, the surface lines in the tapering recess section in the region of the vertices of the second protrusions form, at least in sections, an angle with respect to the screw axis of less than 1.5°.

12. The system according to claim 1, in which the cross-sectional shape of the receiving recess of the screw in the cylindrical or quasi-cylindrical recess section corresponds to the cross-sectional shape of a receiving recess with a hexalobular profile of a screw according to ISO 14583.

13. The system according to claim 1, wherein in the drive tool, the outer surface of said quasi-cylindrical section has a conical shape configured so that the surface lines in each outer surface section are inclined by at least 2.5° with respect to the central axis.

14. The system according to claim 1, wherein in the drive tool, in said tapering section, the surface lines in the region of the radially outer vertex sections of the first protrusions have, at least in sections, an angle of at least 40° with respect to the central axis.

15. The system of claim 1, wherein in the drive tool, the surface lines in the quasi-cylindrical section in the core sections and/or in the radially outer vertex sections are inclined, at least in sections, by at least 2.5° with respect to the central axis.

16. The system according to claim 1, wherein in said tapering recess section of said screw, the surface lines in the region between the second protrusions have, at least in sections, an angle with respect to the screw axis of at least 40°.

17. The system according to claim 1, wherein the shape of the receiving recess is adapted to the shape of the drive tool such that the screw and the drive tool, from a central position in which the central axis of the drive tool and the screw axis coincide, can be tilted in the connected state against one another by a maximum of 5°.

18. The system according to claim 1, wherein said cylindrical or quasi-cylindrical section of the screw is a cylindrical recess section in which all surface lines are parallel to said screw axis.

* * * * *